(12) United States Patent
Fok Ah Chuen et al.

(10) Patent No.: US 9,043,898 B2
(45) Date of Patent: May 26, 2015

(54) ACCESS MANAGEMENT SYSTEM

(75) Inventors: Frederic Fok Ah Chuen, Reading (GB); Benoit Lecroart, Reading (GB); Olivier Perron, Reading (GB)

(73) Assignee: LENOVO INNOVATIONS LIMITED (HONG KONG), Quarry Bay (HK)

( * ) Notice: Subject to any disclaimer, the term of this patent is extended or adjusted under 35 U.S.C. 154(b) by 12 days.

(21) Appl. No.: 13/642,679

(22) PCT Filed: Apr. 18, 2011

(86) PCT No.: PCT/JP2011/059994
§ 371 (c)(1),
(2), (4) Date: Nov. 21, 2012

(87) PCT Pub. No.: WO2011/136150
PCT Pub. Date: Nov. 3, 2011

(65) Prior Publication Data
US 2013/0067564 A1    Mar. 14, 2013

(30) Foreign Application Priority Data
Apr. 29, 2010 (GB) .................................. 1007151.2

(51) Int. Cl.
   *G06F 7/04*      (2006.01)
   *H04L 29/06*     (2006.01)
   *G06F 21/62*     (2013.01)
   *H04W 12/08*     (2009.01)
   *H04W 88/02*     (2009.01)

(52) U.S. Cl.
   CPC .......... *H04L 63/105* (2013.01); *G06F 21/6218* (2013.01); *H04W 12/08* (2013.01); *H04W 88/02* (2013.01)

(58) Field of Classification Search
CPC ..... G06F 21/30; G06F 21/62; H04L 12/2461; H04L 63/10
USPC ........ 726/1, 4, 17, 21, 27; 713/151, 176–177; 380/282; 455/410
See application file for complete search history.

(56) References Cited

U.S. PATENT DOCUMENTS

| | | | |
|---|---|---|---|
| 6,738,799 B2 * | 5/2004 | Dickenson | 709/203 |
| 7,623,548 B2 * | 11/2009 | Gilmartin | 370/468 |
| 7,716,489 B1 * | 5/2010 | Brandt et al. | 713/180 |
| 7,787,863 B2 * | 8/2010 | van de Groenendaal | 455/411 |

(Continued)

FOREIGN PATENT DOCUMENTS

| | | | |
|---|---|---|---|
| JP | 2006502678 A | 1/2001 | |
| JP | 2006-511893 A | 4/2006 | |

(Continued)

OTHER PUBLICATIONS

Mahadev Satyanarayanan, Scalable, secure and highly available distributed file access, May 1990, IEEE, vol. 23, pp. 9-18.*

(Continued)

*Primary Examiner* — Dede Zecher
*Assistant Examiner* — Viral Lakhia (57) ABSTRACT

An access rights management system is presented in which a mobile device may be allowed to access corporately held data in a flexible manner but in which the security and integrity of the data is maintained. The mobile device is provided with a rights adjustment module which modifies the access rights for locally stored corporate data in dependence on the connectivity of the mobile device with a corporate server.

20 Claims, 5 Drawing Sheets

(56) References Cited

U.S. PATENT DOCUMENTS

| | | | |
|---|---|---|---|
| 7,950,044 B2* | 5/2011 | Brandt et al. | 726/2 |
| 7,992,188 B2* | 8/2011 | Ohta et al. | 726/1 |
| 8,056,802 B2* | 11/2011 | Gressel et al. | 235/382 |
| 8,082,451 B2* | 12/2011 | Waris | 713/193 |
| 8,146,148 B2* | 3/2012 | Cheriton | 726/15 |
| 8,234,477 B2* | 7/2012 | Shaath | 711/163 |
| 8,275,356 B2* | 9/2012 | Hickie | 455/410 |
| 8,381,264 B1* | 2/2013 | Corddry et al. | 726/3 |
| 8,412,945 B2* | 4/2013 | Sweet et al. | 713/176 |
| 8,438,619 B2* | 5/2013 | Olson | 726/6 |
| 8,504,032 B2* | 8/2013 | Lott et al. | 455/435.1 |
| 8,504,847 B2* | 8/2013 | Resch et al. | 713/193 |
| 8,528,102 B2* | 9/2013 | Chen et al. | 726/27 |
| 8,601,535 B2* | 12/2013 | Goh et al. | 726/1 |
| 8,613,048 B2* | 12/2013 | Braddy et al. | 726/4 |
| 2004/0083392 A1* | 4/2004 | Yang et al. | 713/201 |
| 2004/0123127 A1 | 6/2004 | Teicher et al. | |
| 2005/0086447 A1* | 4/2005 | Miyamoto et al. | 711/163 |
| 2005/0251675 A1 | 11/2005 | Marcjan et al. | |
| 2007/0198462 A1 | 8/2007 | Ohta et al. | |
| 2008/0104207 A1 | 5/2008 | Pulkkinen et al. | |
| 2008/0173709 A1* | 7/2008 | Ghosh | 235/382 |
| 2008/0177994 A1* | 7/2008 | Mayer | 713/2 |
| 2008/0216161 A1* | 9/2008 | Eibach et al. | 726/6 |
| 2009/0022325 A1* | 1/2009 | Naedele | 380/282 |
| 2009/0132655 A1* | 5/2009 | Behrens | 709/204 |
| 2009/0205032 A1* | 8/2009 | Hinton et al. | 726/7 |
| 2009/0300710 A1* | 12/2009 | Chai et al. | 726/1 |
| 2010/0293594 A1* | 11/2010 | Goh et al. | 726/1 |
| 2010/0333116 A1* | 12/2010 | Prahlad et al. | 719/328 |
| 2011/0047614 A1* | 2/2011 | Huang et al. | 726/19 |
| 2011/0087603 A1* | 4/2011 | Garcia et al. | 705/55 |
| 2011/0184993 A1* | 7/2011 | Chawla et al. | 707/802 |
| 2013/0268582 A1* | 10/2013 | Sitati et al. | 709/203 |

FOREIGN PATENT DOCUMENTS

| | | |
|---|---|---|
| JP | 2007-207171 A | 8/2007 |
| JP | 2007257057 A | 10/2007 |
| JP | 2007304861 A | 11/2007 |
| JP | 2008-033855 A | 2/2008 |
| JP | 2008-527475 A | 7/2008 |

OTHER PUBLICATIONS

Peter Wagner, "Nikkei Byte", Aug. 1997, 12 pages.

* cited by examiner

ACCESS MANAGEMENT SYSTEM

CROSS REFERENCE TO RELATED APPLICATIONS

This application is a National Stage of International Application No. PCT/JP2011/059994 filed Apr. 18, 2011, claiming priority based on United Kingdom Patent Application No. 1007151.2, filed Apr. 29, 2010, the contents of all of which are incorporated herein by reference in their entirety.

TECHNICAL FIELD

The present invention relates to a system, methods, and associated devices for managing data access rights and in particular, but not limited to, the management of access rights for data stored in the memory of a mobile communications device or on a portable storage device suitable for connection to a mobile communications device.

BACKGROUND ART

Based on current development trends it seems inevitable that each new generation of mobile device will be provided with improved memory storage capability compared to previous generations. This improved memory storage capability may, for example, come both through increases in local internal memory capacity and through the capability to attach portable storage devices such as universal serial bus (USB) keys, secure digital (SD) cards, other devices having embedded flash memory, or the like (new developments of which will also have increased storage capacities).

In parallel with this will come a greater emphasis on so called cloud computing, in which on-demand access is provided to a shared pool of configurable computer resources over the internet. In this forthcoming cloud computing era, it will be necessary to address the important issue of securely managing corporate data (for example data owned by a user's employer), and in particular providing the right balance between security and data access flexibility, especially when large quantities of the corporate data could potentially be stored locally at the terminal device.

SUMMARY OF INVENTION

Technical Problem

It is usual, for example, for a company to want to preserve information generated internally, and to prevent such information from being disclosed, copied, moved, or altered outside its internal network. However, in the case of cloud computing the potential changes in the storage context of the corporate data results in challenges for effective data rights management. For example, although the data can remain in the internal network, large quantities of it can also reside in the local memory of (and/or in a portable storage device attached to) a mobile device, to allow a user the flexibility to access the information when the mobile device becomes disconnected from the network. This situation might arise, for example, in the case of a mobility scenario (e.g. when the user is travelling outside the company, or when the user manually disconnects the mobile device from the network to preserve the battery).

As a result of the potential changing context of the corporate data, there is a need to provide flexible data access rights management (for example, management of access rights such as read permissions, write permissions, permissions to execute, or the like) which maintains effective control of the data without significantly compromising data security or integrity.

Accordingly, the present invention seeks to provide improved access rights management.

Solution to Problem

In accordance with one aspect of the present invention there is provided a method of managing access rights for data, characterised by determining the connectivity of a mobile communications device to a network and granting access rights for the data in dependence on said connectivity.

In accordance with another aspect of the present invention there is provided a method of provisioning a mobile device for managing access rights for data held locally relative to the mobile communications device, characterised by receiving, at the mobile device, configuration parameters defining access rights for the data, which access rights vary in dependence on the connectivity of the mobile communications device to a network.

In accordance with another aspect of the present invention there is provided a method of provisioning a mobile device for managing access rights for data, characterised by providing the mobile device with configuration parameters defining access rights for the data, which access rights vary in dependence on the connectivity of the mobile communications device to a network.

In accordance with another aspect of the present invention there is provided a method of managing access rights for data held locally relative to a mobile communications device, the method comprising: determining connectivity of the mobile communications device to a network; granting a first set of access rights for the data when the mobile communications device is connected to the network; and granting a second set of access rights for the data when the mobile communications device is not connected to the network; wherein the first set of access rights is different to said second set of access rights.

It will be appreciated that the step of granting the first set of access rights for the data, when the mobile communications device is connected to the network, may be performed at the mobile communications device or at the server device.

The second set of access rights may comprises at least one access right which is more restrictive than a corresponding access right of the first set of access rights. The first and second set of access rights may each comprise at least one of read permissions, write permissions, and execute permissions.

The granting of said first and/or said second set of access rights may further comprise granting access rights which vary in dependence on at least one of: an identity of a file comprising the data; a file type of the file comprising the data; a rights access level assigned to the file comprising the data; membership of the file comprising the data in a predefined group; and/or an identity of a directory in which the file comprising the data is located.

The granting said first and/or said second set of access rights may further comprise granting access rights which vary in dependence on an identity of a user of the mobile device and/or membership of the user of the mobile device in a predefined user group.

Determining the connectivity of the mobile communications device to a network may comprise determining connectivity of said mobile device to predefined server apparatus and said first and second set of access rights may be granted in dependence on said connectivity to said predefined server apparatus.

Determining the connectivity to said predefined server apparatus may comprise: determining that the mobile communications device is connected to server apparatus; may comprise obtaining information representing the identity of the server apparatus to which the mobile device is connected; may comprise obtaining information representing the identity of the predefined server apparatus; and may comprise comparing the identity of the server apparatus to which the mobile device is connected with the identity of the predefined server apparatus, whereby to determine the connectivity of said mobile device to said predefined server apparatus.

The method may be performed by a rights management module operating on the mobile device and the information representing the identity of the predefined server apparatus may be obtained from configuration parameters provided for configuring the rights management module. The information representing the identity of the predefined server apparatus may be obtained by retrieving it from the data held locally relative to the mobile communications device. The identity of the predefined server apparatus may be obtained by receiving it from an application running locally on the mobile communications device.

The data may be encrypted and the method may comprise decrypting the data for which the access rights are granted on the mobile communications device when the mobile communications device is not connected to the network. The data may be encrypted and the method may comprise receiving a decrypted version of the data for which the access rights are granted, from server apparatus, when the mobile communications device is connected to the network.

The method may comprise detecting an attempt to mount a portable storage device on which said data is stored on the mobile communications device, may comprise requesting entry of secure input information from a user of the mobile communications device, may comprise receiving the secure input information from the user, verifying the received secure input information, may comprise allowing successful mounting of the portable storage device if the secure input information is successfully verified, and may comprise inhibiting mounting of the portable storage device if the secure input information is not successfully verified.

The method may comprise detecting a change in the connectivity of the mobile communications device to a network from connected state to disconnected state and may comprise adjusting the access rights from the first set of access rights to the second set of access rights on detection of the change.

The method may comprise detecting a change in the connectivity of the mobile communications device to a network from disconnected to connected and may comprise adjusting the access rights from the second set of access rights to the first set of access rights on detection of the change.

The method may comprise determining the differences between the first and second set of access rights and using this result for adjusting the access rights to accelerate the access right adjustment process.

In accordance with another aspect of the present invention there is provided a method of provisioning a mobile device for managing access rights for data held locally relative to the mobile communications device, the method comprising: receiving, at the mobile communications device, configuration parameters defining a first set of access rights for the data for use when the mobile communications device is connected to a network; receiving, at the mobile communications device, configuration parameters defining a second set of access rights for the data for use when the mobile communications device is not connected to the network; and storing said configuration parameters for use in managing said access rights for the data held locally relative to the mobile communications device; wherein the first set of access rights is different to said second set of access rights.

In accordance with another aspect of the present invention there is provided a method (for example performed by a server) of provisioning a mobile device for managing access rights for data held locally relative to the mobile communications device, the method comprising: providing the mobile communications device with configuration parameters defining a first set of access rights for the data for use when the mobile communications device is connected to a network; and providing the mobile communications device with configuration parameters defining a second set of access rights for the data for use when the mobile communications device is not connected to the network; wherein the first set of access rights is different to said second set of access rights.

The method may comprise determining that updated configuration parameters are available, and may comprise providing the updated configuration parameters to the mobile communications device in response to said determination.

Providing the configuration parameters may comprise providing configuration parameters which define access rights which are dependent on at least one of: an identity of a file comprising the data; a file type of the file comprising the data; a rights access level assigned to the file comprising the data; membership of the file comprising the data in a predefined group; and/or an identity of a directory in which the file comprising the data is located.

The method, as performed at the server, may comprise: detecting an attempt to mount a portable storage device on which said data is stored on the mobile communications device, sending a request for entry of secure input information by a user to the mobile communications device, receiving the secure input information from the mobile communications device, verifying the received secure input information, allowing successful mounting of the portable storage device if the secure input information is successfully verified, and inhibiting mounting of the portable storage device if the secure input information is not successfully verified.

The data may be encrypted and the method performed at the server may comprise receiving the encrypted data from the mobile communications device, decrypting the encrypted data, and sending the decrypted data to the mobile communications device.

The data may be encrypted and the method performed at the server may comprise receiving the encrypted data from the mobile communications device, decrypting the encrypted data, and providing remote access to the decrypted data to the mobile communications device.

In accordance with another aspect of the present invention there is provided a mobile communications device having means for managing access rights for data held locally relative to the mobile communications device, the access rights managing means comprising: means for determining the connectivity of the mobile communications device to a network; means for granting a first set of access rights for the data when the mobile communications device is connected to the network; and means for granting a second set of access rights for the data when the mobile communications device is not connected to the network; wherein the first set of access rights is different to said second set of access rights.

In accordance with another aspect of the present invention there is provided a mobile communications device having means for managing access rights for data held locally relative to the mobile communications device, the access rights managing means comprising: means for receiving, at the mobile communications device, configuration parameters defining a first set of access rights for the data for use when the mobile communications device is connected to a network; means for receiving, at the mobile communications device, configuration parameters defining a second set of access rights for the data for use when the mobile communications device is not connected to the network; and means for storing said configuration parameters for use in managing said access rights for the data held locally relative to the mobile communications device; wherein the first set of access rights is different to said second set of access rights.

The rights managing means may comprise a rights management module operable to run on said mobile communications device. The rights management module may be operable to initiate on boot-up of the mobile device.

In accordance with another aspect of the present invention there is provided server apparatus having means for provisioning a mobile device to manage access rights for data held locally relative to the mobile communications device, the provisioning means comprising: means for providing the mobile communications device with configuration parameters defining a first set of access rights for the data for use when the mobile communications device is connected to a network; and means for providing the mobile communications device with configuration parameters defining a second set of access rights for the data for use when the mobile communications device is not connected to the network; wherein the first set of access rights is different to said second set of access rights.

In accordance with another aspect of the present invention there is provided a computer program, computer program product or computer readable medium comprising instructions for carrying out a method according to any of the method aspects.

In accordance with another aspect of the present invention there is provided a mobile communications device having a module for managing access rights for data held locally relative to the mobile communications device, the access rights managing module being operable to: (i) determine the connectivity of the mobile communications device to a network; (ii) grant a first set of access rights for the data when the mobile communications device is connected to the network, and (iii) grant a second set of access rights for the data when the mobile communications device is not connected to the network; wherein the first set of access rights is different to said second set of access rights.

In accordance with another aspect of the present invention there is provided a mobile communications device having a module for managing access rights for data held locally relative to the mobile communications device, the access rights managing module being operable to: (i) receive configuration parameters defining a first set of access rights for the data for use when the mobile communications device is connected to a network; (ii) receive configuration parameters defining a second set of access rights for the data for use when the mobile communications device is not connected to the network; and (iii) store said configuration parameters for use in managing said access rights for the data held locally relative to the mobile communications device; wherein the first set of access rights is different to said second set of access rights.

In accordance with another aspect of the present invention there is provided server apparatus having a provisioning module for provisioning a mobile device to manage access rights for data held locally relative to the mobile communications device, the provisioning module being operable to provide the mobile communications device with: (i) configuration parameters defining a first set of access rights for the data for use when the mobile communications device is connected to a network, and (ii) configuration parameters defining a second set of access rights for the data for use when the mobile communications device is not connected to the network; wherein the first set of access rights is different to said second set of access rights.

Advantageous Effects of Invention

Advantageously, the present invention enables to provide improved access rights management.

DESCRIPTION OF EMBODIMENTS

Figure 1:
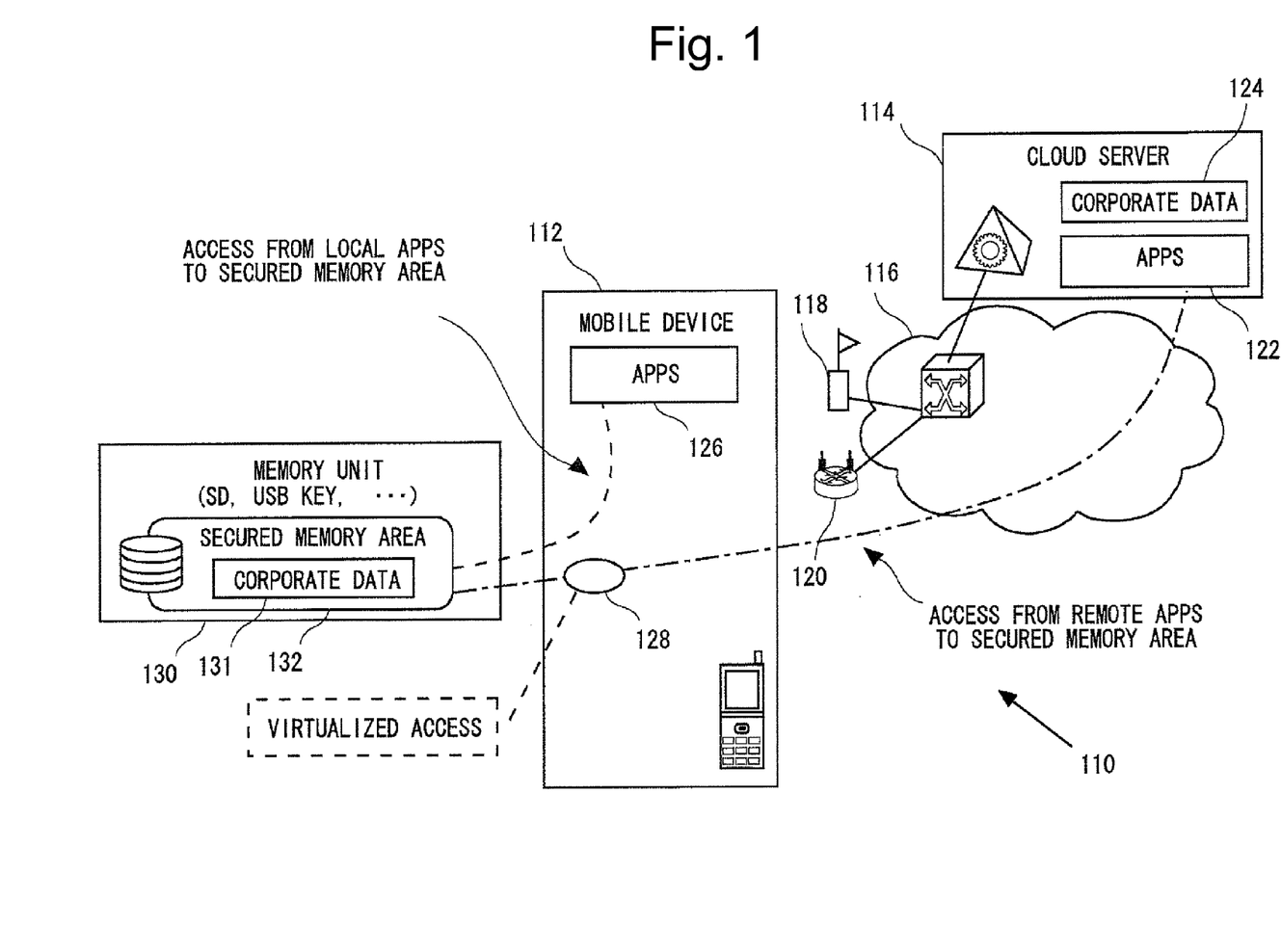
FIG. 1 shows, in simplified overview, a communication system in which corporate data may be accessed in a number of different contexts.

FIG. 1 shows, in simplified overview, a communication system generally at 110. The communication system comprises a mobile communications device 112 which is capable of connecting to a cloud server 114 via a computer network 116 such as the internet. As seen in FIG. 1, the mobile communications device 112 is connectable to the computer network 116 wirelessly, for example, via a base station 118 of a mobile telecommunications network, and/or via a wireless router 120.

The cloud server 114 is provided with storage in which software applications 122 (referred to as 'remote' applications) and 'corporate' data 124 are stored. These applications 122 and the corporate data 124 are remotely accessible by a user of the mobile communications device 112, via the computer network 116. Such access can be done through a wide range of technologies (a File Transfer Protocol session, an HTTP web session, a thin client connection, a Secure Shell connection, etc.). The corporate data 124 comprises information owned by a third party who wishes to manage accessibility to the corporate data 124 in accordance with their corporate policies. The third party may, for example, be the employer of the user or the provider of a service to which the user subscribes.

The mobile communications device 112 is provided with its own internal memory in which local software applications 126 are stored. The local applications 126 comprise an application for providing virtualised access 128 to the remote applications 122 and to corporate data 124 stored at the cloud server 114. The mobile communications device 112 is also provided with an external portable storage device 130 which can be mounted on the mobile device 112 via an appropriate interface (e.g. USB, SD, or the like). The portable storage device 130 comprises a secure memory area 132 in which some of the corporate data 131 (or a copy of it) may be stored locally, for access when the mobile device 112 is no longer connected to the cloud server 114. Some of the corporate data 131 (or a copy of it) may, alternatively or additionally, be stored in the internal memory of the mobile communications device 112.

The cloud server 114 of the communication system is configured to apply appropriate access control procedures for the corporate data 131 stored in its storage device 130 and/or to impose a rules based policy on the mobile device 112 to limit the way in which it interacts with the remote applications 122, to allow access to the portable storage device 130, and/or to handle the corporate data 124, 131.

In operation, the corporate data 124, 131 is accessible by the user of the mobile device 112, through virtualised interface access 128 to the remote applications 122, when the mobile device 112 is connected to the cloud server 114 via the computer network 116. In practice the secured memory area 132 can be mounted by the cloud server 114 so that remote applications 122 can access the corporate data 131 as if it was locally available at the cloud server 114. The locally stored corporate data 131 is, however, also accessible directly using the local applications 126. This allows a user to have access to the locally stored corporate data 131 when, for example, the mobile device 112 becomes disconnected from the cloud server 114 unintentionally as a result of lack of coverage or intentionally to conserve battery life. Notwithstanding any access control procedures and/or rules based policies imposed by the cloud server 114, however, this local accessibility represents a potential weakness in the ability of the cloud server 114 to manage the corporate data 124, 131 effectively and, in particular, to ensure adequate security and/or the integrity of the corporate data 124, 131. Whilst steps could be taken to restrict access only to the remote applications 122 via virtualised access, or to prevent a copy of the corporate data 124, 131 being maintained locally at the mobile device 112, such restrictions are inflexible, can be particularly inconvenient to remote users, and can limit the ability of key employees to work effectively when out of the office.

An exemplary embodiment of a communication system will now be described in which improved access rights management is provided to address or at least mitigate some of the above issues.

Figure 2:
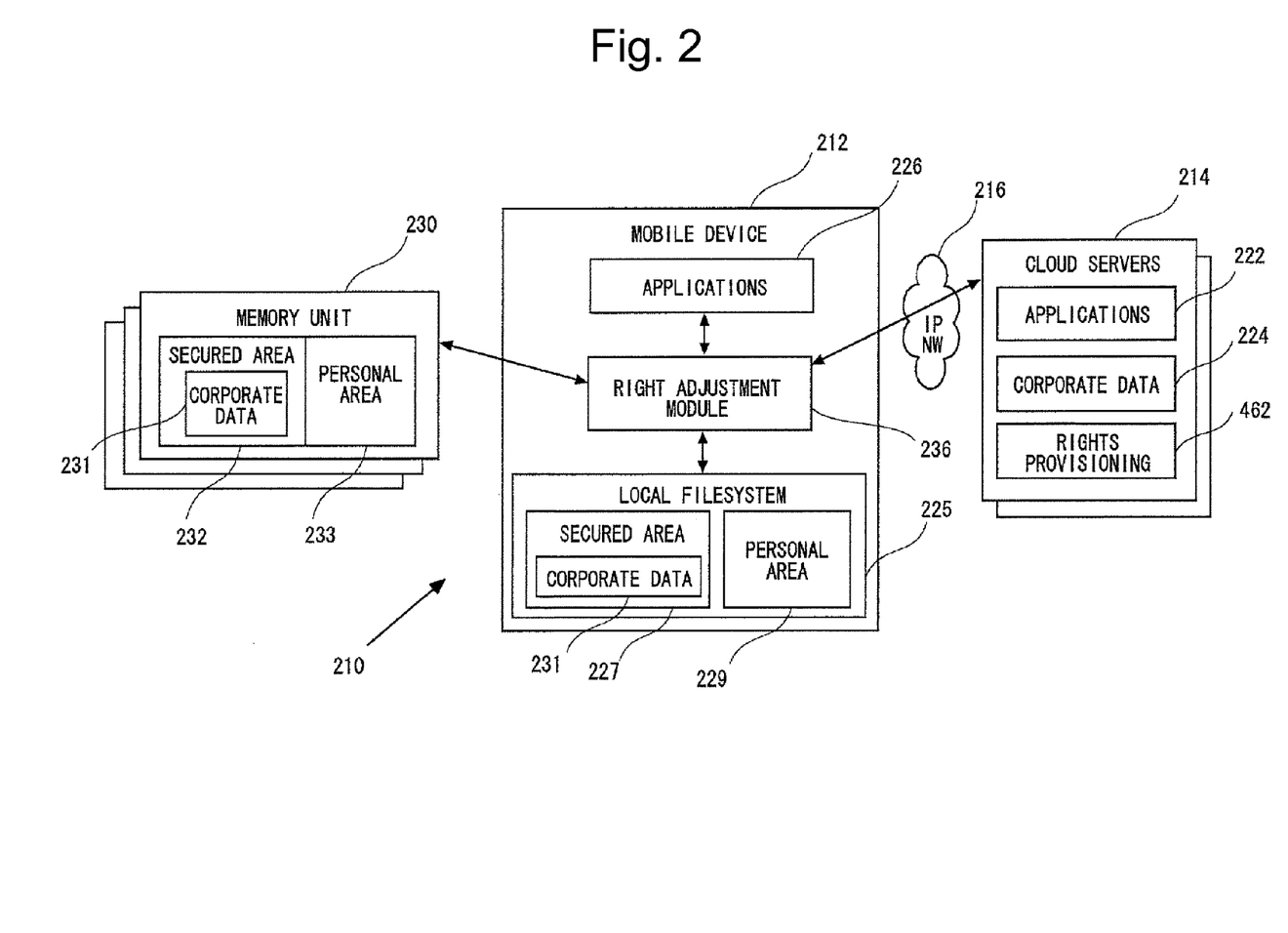
FIG. 2 shows, in simplified overview, a communication system having improved access rights management.

FIG. 2 shows, generally at 210, a communication system incorporating an exemplary embodiment of the invention which aims to provide a versatile system in which a balance between providing flexibility for an end user and maintaining data security and integrity can be achieved more effectively.

The communication system 210 is similar to the communication system 110 shown in FIG. 1 (with like parts having reference numerals having the same last two digits).

The communication system comprises a mobile communications device 212 which is capable of connecting to any of a plurality of cloud servers 214 of a corporate network via a computer network 216, such as the internet, as generally described previously. The mobile communications device 212 is configured to achieve this connectivity using known technologies, for example, via a VPN connection, or a secured thin client connection (e.g. using Remote Desktop Protocol, Independent Computing Architecture, etc.).

Each cloud server 214 is provided with storage local to the cloud server 214 in which software applications 222 (referred to as 'remote' applications) and 'corporate' data 224 are stored. These applications 222 and the corporate data 224 are remotely accessible by a user of the mobile communications device 212, via the computer network 216. The corporate data 224 comprises information owned by a third party who wishes to manage accessibility to the corporate data 224 in accordance with their corporate policies. The third party may, for example, be the employer of the user or the provider of a service to which the user subscribes.

The mobile communications device 212 is provided with its own internal memory in which local software applications 226 are stored. The mobile communications device 212 is also provided with an interface for connecting any of a plurality of portable storage devices 230 to the mobile device 212. Each portable storage device 230 comprises a secure memory area 232 in which some or all of the corporate data 231 (or a copy of it) may be stored locally and a further non-secured memory area 233 for storing personal data. Similarly, the internal memory of the mobile device 212 is provided with a local file system 225 having a secured memory area 227 in which some or all of the corporate data 231 may be stored and a non-secured further memory area 229 for storing personal data.

The corporate data in the secured memory areas 232, 227 of portable storage device 230 and the local file system 225 can be accessed and decrypted locally on the mobile device 212 (which will be referred to as being 'locally' mounted). The corporate data in the secured memory areas 232, 227 of portable storage device 230 can also be accessed and decrypted remotely by the server 214 (which will be referred to as being 'virtually' or 'remotely' mounted) when the mobile device 212 is connected to it.

The mobile communications device 212 and the server 214 are also respectively provided with a rights adjustment module 236, and a rights provisioning module 462. The rights adjustment module 236 is configured to determine whether the mobile device 212 is connected to one or more remote servers 214 and, depending on this determined connectivity, to adjust data access rights for any locally stored corporate data 231 (i.e. the corporate data stored in memory area 227 or in memory area 232). The rights provisioning module 462 is configured for general management of access rights and for providing the configuration parameters required to set up the rights adjustment module 236 of the mobile device 212 (if set up remotely), based on an internal corporate network policy. When the mobile device 212 connects to a remote server 214 of the corporate network, the rights adjustment module 236 detects the connection. If the corporate data is mounted and decrypted locally, the rights adjustment module 236 then modifies the access rights for the corporate data 231 residing in the secure area 232 of the external storage device 230 and/or the secure area 227 of the local file system 225, to grant data access rights to the user of the mobile device 212 in accordance with the internal corporate network policy. For example, the user may be granted full access rights including rights to read and modify the data and/or execute data forming an executable file if the mobile device 212 is connected to the server 214.

When the mobile device 212 connects to a remote server 214 of the corporate network, the rights provisioning module 462 also detects the connection. If the corporate data is virtually mounted and decrypted remotely on the remote server 214, the rights provisioning module 462 then modifies the access rights for the virtually mounted corporate data 231 residing in the secure area 232 of the external storage device 230 and/or the secure area 227 of the local file system 225 of the mobile device 212, to grant data access rights to the user of the mobile device 212 in accordance with the internal corporate network policy. When the mobile device 212 disconnects from the corporate network, the rights adjustment module 236 detects this change in connectivity and adjusts the access rights for the corporate data 231 residing in the locally attached secure memory areas 227, 232, to limit the access rights, in dependence on the corporate policy. For example, the access rights may be modified to allow a user to read the data but not to modify it.

The rights adjustment module 236 of the mobile device 212 operates under the control of the server 214 to allow the owner of the corporate data 231 to manage access rights effectively. In this way, the rights adjustment module 236 can be dynamically provisioned, for example to update the access control policy for the secure areas 227, 232 and/or provide new local access permissions when required.

Accordingly, the system advantageously provides a method and apparatus by which access rights to locally held corporate data 231 can be adjusted dynamically and managed under the control of the data owner in dependence on whether or not the mobile device is connected to a corporate server 214. This allows the owner of the corporate data 224, 231 greater versatility to provide an appropriate balance between flexibility for an end user and the need to maintain the security and integrity of the corporate data 224, 231 when the corporate data 231 is effectively stored externally to the corporate network.

Mobile Device

Figure 3:
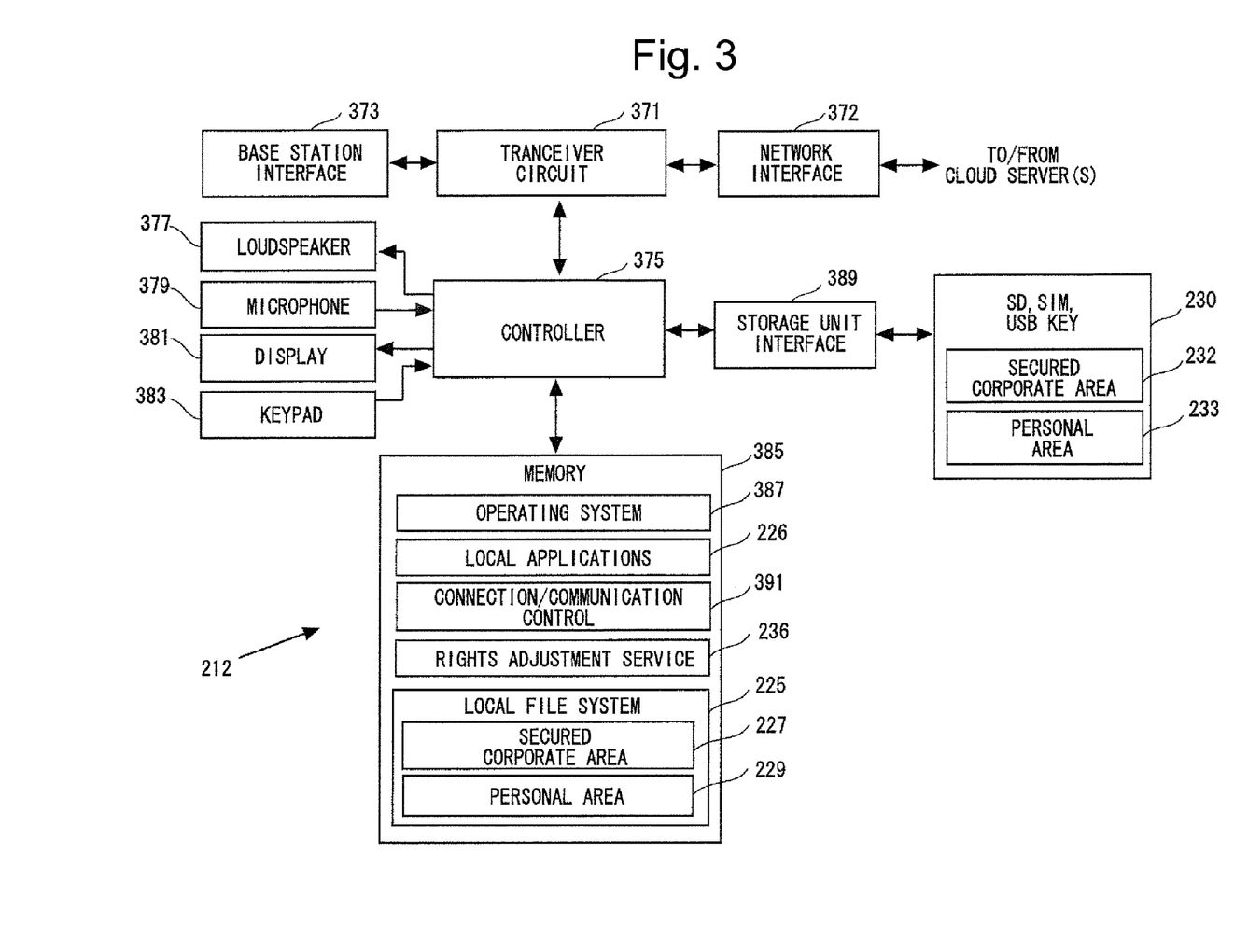
FIG. 3 is a simplified functional block schematic of an implementation of a mobile device suitable for use in the communication system of FIG. 2.

FIG. 3 schematically illustrates the main components of the mobile communication device 212 shown in FIG. 2. In this embodiment, the mobile device 212 operates as a thin client device which connects to a virtual machine running on the server 214 via a user session.

In this embodiment, the mobile device 212 comprises a mobile telephone having a transceiver circuit 371 which is operable to transmit signals to and to receive signals from a base station of a conventional mobile telecommunications network via a base station interface 373. The transceiver circuit 371 is also operable to transmit signals to and to receive signals from the servers 214 over the computer network 216 (e.g. the internet) either through an access point via a network interface 372 or through a mobile telephone network via the base station interface 373.

As shown, the mobile device 212 also includes at least one controller 375 comprising a processor which controls the operation of the mobile device 212 and which is connected to the transceiver circuit 371 and to a loudspeaker 377, a microphone 379, a display 381, and a keypad 383. The processor 375 operates in accordance with software instructions stored within memory 385. As shown, these software instructions provide, amongst other things, an operating system 387, the local applications 226, the rights adjustment module 236, and a connection/communications control module 391. As discussed previously, the rights adjustment module 236 is operable to control access rights to the corporate data 231 stored locally. The connection/communications control module 391 is operable to control communications made via the transceiver circuit 371 and to manage network connections with the remote server 214 via the network interface 372 or via the mobile network.

The mobile device 212 is provided with internal and external data storage capabilities in the form of the local file system 225 which resides in the memory 385, and a storage interface 389 via which any of the plurality of portable storage devices 230 (e.g. a USB key and/or an SD card) may be connected. The local file system 225 and the portable storage device 230 are configured with a personal memory area 229, 233 for storing personal data and a secured memory area 227, 232 for storing corporate data 224, 231. All data stored in the secured memory areas 227, 232 is encrypted to effectively prevent it from being read or modified without use of a corresponding encryption/decryption key, password, and/or keyfile.

The rights adjustment module 236, manages the rights of corporate data stored locally either in the local file system 225 or in the secured area of a mounted portable storage devices 230. The rights adjustment module 236 also manages decryption of the encrypted corporate data when the mobile device is disconnected from the server 214.

The rights adjustment module 236 is typically implemented in the form of a software service running on the operating system 387 hosted on the mobile device 212. In this embodiment, the rights adjustment module 236 is run as a daemon and initiated during boot-up of the mobile device 212 after which it is capable of analysing whether the mobile device 212 is connected to the remote server 214, of monitoring the connectivity for any changes, and of determining whether a portable storage device 230 carrying corporate data 231 is mounted via the interface 389.

In this embodiment the rights adjustment module 236 is provided with configuration parameters for identifying each remote server 214 for which connectivity based access rights management is to be applied (e.g. servers belonging to the corporate network). When connection to a remote server 214 is detected, the rights adjustment module 236 compares the identity of the server(s) identified by the configuration parameters with identification data received from the remote server 214 for which connection has been detected. If the identification data received from the remote server indicates that it is a server represented by the configuration parameters, and if the corporate data 231 is to be mounted locally, then access rights management for the connected state is applied. Otherwise, if the identification data received from the remote server indicates that it is not a server represented by the configuration parameters, then access rights management for the disconnected state continues to be applied.

As described previously, when the rights adjustment module 236 detects that the mobile device 212 becomes connected to a remote server 214 of the corporate network for which connectivity based access rights management is to be implemented, it modifies the access rights for the corporate data 231 residing in the secure area 232 of the portable storage device 230 and/or the secure area 227 of the local file system 225, to grant data access rights to the user of the mobile device 212 in accordance with an associated corporate network policy. When the rights adjustment module 236 detects that the mobile device 212 changes from a connected to a disconnected state, however, it modifies these access rights to ensure data security and integrity is maintained.

The rights adjustment module 236 also detects when an attempt is made to mount a portable storage device 230 having a secured area 232 via the interface 389, or to access the secured area 227 of the local file system 225. On detection of such an attempt, when the mobile device 212 is not connected to the corporate network, the rights adjustment module requests the entry of secret input information such as a secret key, password or the like. The secret input information entered is subject to a verification process and, if successfully (i.e. the password or other secret information is correctly entered) the rights adjustment module 236 allows the portable storage device 230 to be mounted or the secured area 227 of the local file system 225 to be accessed. Otherwise successful mounting of the portable storage device 230, or access to the secured area 227, 232, is prevented. When the portable storage device 230 has been mounted successfully, or access to the secure area 227 of the local file-system 225 has been allowed, the rights adjustment module 236 grants appropriate data access rights for any corporate data 231 stored on the storage device 230 or in the local file-system 225 accordingly. For example, when the mobile device 212 is not connected to the cloud server 214 and a user (or a local application) successfully mounts an encrypted volume in which corporate data 231 is stored, the rights adjustment module 236 adjusts the access rights for the corporate data 231 in dependence on the corporate network policy.

The rights adjustment module 236 maintains the security credentials (e.g. keys, passwords, and/or keyfiles) required for decrypting the locally stored corporate data 231. Accordingly, when the mobile device 212 is disconnected from the corporate network, decryption of corporate data 224, 231 stored in any of the secured areas 227, 232, is performed in the local memory 385, under the supervision of the rights adjustment module 236. Similarly, when the mobile device 212 is connected to the server 214, and the corporate data is mounted locally, decryption of corporate data 224, 231 stored in any of the secured areas 227, 232, is performed in the local memory 385, under the supervision of the rights adjustment module 236.

The corporate network policy sets configuration parameters for the rights adjustment module 236, which parameters define how and under what conditions the rights adjustment module 236 adjusts the access rights and, in this embodiment, the identity of the cloud servers 214 for which connectivity based access rights management is to be applied. The corporate network policy may, for example, define different 'confidentiality' or 'rights access' levels for different files, file types, groups to which the files belong and/or directories and, based upon these different rights access levels, different access policies may be applied by the rights adjustment module 236. The corporate network policy also defines up-to-date keys, passwords, and/or keyfiles required for encryption/decryption of locally stored corporate data 231 under the supervision of the rights adjustment module 236. The rights adjustment module 236 is operable to receive corporate policy updates from the server 214, from time to time, when the mobile device 212 is connected to allow the owner of the corporate data 224, 231 to manage access rights effectively. In this way, the rights adjustment module 236 can be dynamically provisioned by the server.

In dependence on the corporate policy, for example, a user may be granted full access rights to the corporate data 231 when connected and more restrictive or 'partial' access rights (e.g. read only) when disconnected. The access rights may be adjusted in this way for a whole secured volume or for individual files, file types, or directories stored in that volume. Thus, when the mobile device is disconnected, a file can be defined with a read only permission thereby granting a user the ability to read the file, or read the names of the files in a directory, whereas when the mobile device is connected, the same file can be provided with read and write permissions to allow modification of the file or entries in the directory.

In summary, therefore, the mobile device 212 shown in FIG. 3 is capable of interfacing with external portable storage devices 230 such as SD cards, USB sticks or the like. The mobile device 212 is also capable of accessing an internal file system 225, in the local random access memory 385, which file system 225 was initialised during boot-up of the device 212. The mobile device 212 can connect to a cloud server 214 via a user session on a virtual machine configured to run the preferred applications of the user. The mobile device 212 runs a rights adjustment module 236, which is provisioned by the rights provisioning module 462 running on the server 214, and which is configured to adjust the access permissions for corporate data 231 stored locally on an encrypted volume 227, 232, when the encrypted volume is locally mounted and the mobile device 212 becomes disconnected from the cloud server 214.

Server

Figure 4:
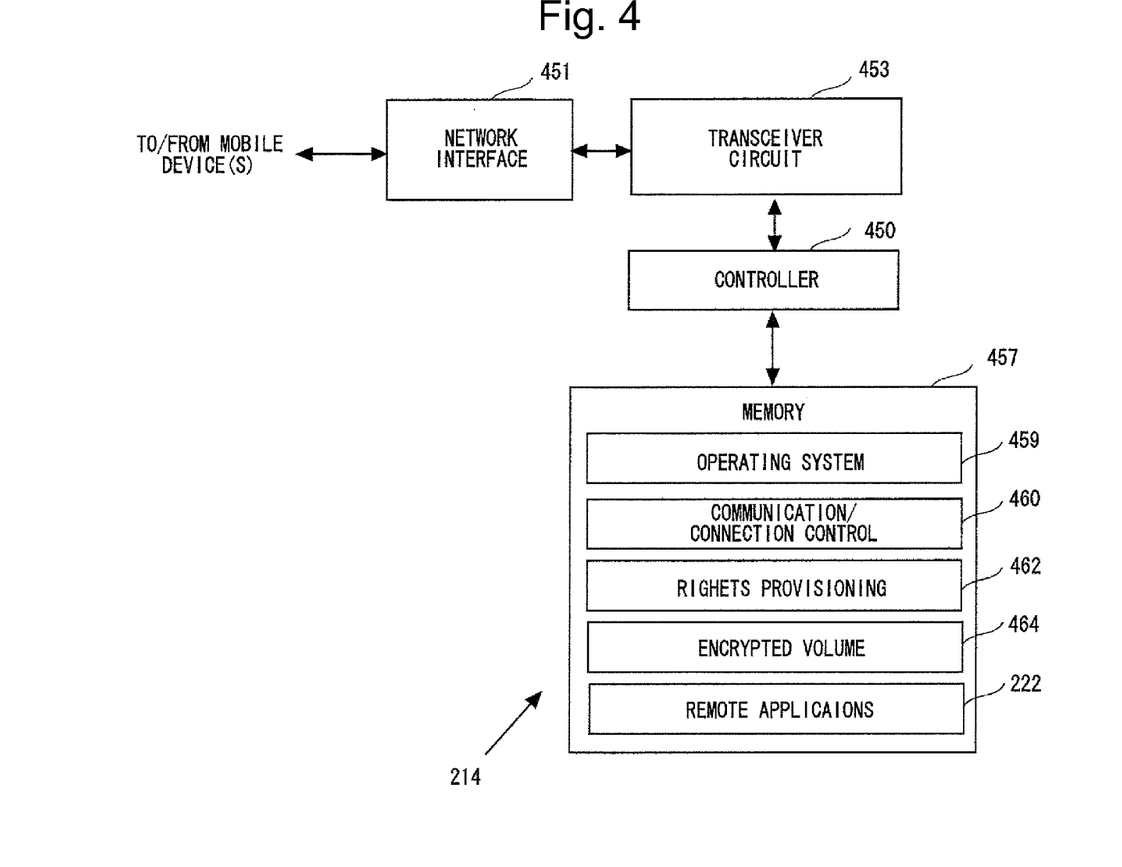
FIG. 4 is a simplified functional block schematic of an implementation of a cloud server suitable for use in the communication system of FIG. 2.

In FIG. 4 the main components of one of the cloud servers 214 shown in FIG. 2 are illustrated schematically. In this embodiment, the cloud server 214 operates as a thin client management server device which is capable of accepting a user connection request from a mobile device 212, and for configuring a user session on a virtual machine running on the server in response to the request.

As seen in FIG. 4, the server 214 comprises transceiver circuitry 453 which is operable to transmit signals to and to receive signals from the mobile device 212 via an associated network interface 451 and a computer network such as the internet. As shown, the server 214 comprises a controller 450 which controls the operation of the cloud server 214 and which is connected to the transceiver circuit 453. The controller 450 operates in accordance with software instructions stored within memory 457. As shown, these software instructions include, amongst other things, an operating system 459, a communications/connection module 460, the rights provisioning module 462, and an encrypted volume 464 on which corporate data 224 resides. Also stored in memory, as described previously, are the remote software applications 222 which the server 214 may host on behalf of the mobile device 212.

The communications/connection module 460 is operable to control communications made via the transceiver circuitry 453, to accept/reject connection requests from a mobile device 212, to set up a connection with the mobile device 212 when a request is accepted, and to manage the connection once set up.

The rights provisioning module 462 provides the configuration parameters required to set up the rights adjustment module 236 of the mobile device 212 (if set up remotely), based on the corporate network policy. The rights provisioning module 462 also provides, from time to time, updates of these configuration parameters to the rights adjustment module 236 to ensure that the rights adjustment policy applied by the rights adjustment module 236 remains up-to-date. In this embodiment the rights provisioning module 462 also manages decryption of the encrypted corporate data when the mobile device is connected to the server 214.

The rights provisioning module 462 also carries out a number of tasks, when the mobile device 212 is connected, which are similar to those performed by the rights adjustment module 236 when the mobile device 212 is not connected. For example, when the mobile device 212 is connected, the rights provisioning module 462 detects when an attempt is made: to virtually mount a portable storage device 230 having a secured area 232 via the interface 389 of the mobile device 212; to virtually access the secured area 227 of the local file system 225; or to mount the encrypted volume 464 of the server 214. On detection of such an attempt, in the case of virtual mounting, it is the rights provisioning module 462, rather than the rights adjustment module on the mobile device 212, which requests the entry of the secret key, password or the like before allowing access to the secured area 227, 232.

The rights provisioning module 462 also maintains the security credentials (e.g. keys, passwords, and/or keyfiles) required for decrypting both the locally and the remotely stored corporate data 224. Accordingly, when the mobile device 212 is connected to the server 214, and the corporate data physically stored locally to the mobile device 212 is virtually mounted, decryption of corporate data 224, 231 stored in any of the local or remote secured and encrypted areas 227, 232, 464, for access by a user, may be performed, by the server on-the-fly. Thus, the decryption is performed on the mobile device 212 if the encrypted corporate data 231 is locally mounted, and is performed on the remote server 224 when the mobile device 212 is virtually mounted remotely.

In summary therefore, the cloud server 214 is capable of accepting user connection requests and of configuring a user session on a virtual machine for a remote user. The server 214 is also capable of accessing corporate data 231 stored in the memory attached to the mobile device (in the local file-system 225, or in an external portable storage device 230). The server 214 allows encrypted volumes to be mounted for use by the remote user in dependence on the correct entry of a secret key selected by the user or the owner of the volume. The encrypted volume can be part of the file-system 225 available on the mobile device, can be a secured memory area 232 (or 'container') configured in an external portable storage device 230 (SD card, SIM, USB KEY), or can be a remotely accessible secured memory area 464 located at the server 214. The server 214 can decrypt the encrypted data, on-the-fly, for use by the 'local' applications 226 of the mobile device 212 and/or by 'remote' applications 222 of the server 214. The server 214 also configures the rights adjustment module 236 of the mobile device 212 and provisions the rights adjustment module 236 dynamically to allow changes in corporate policy and/or the policy for existing or new corporate data 224, 231 to be updated.

Rights Adjustment Procedure

Figure 5:
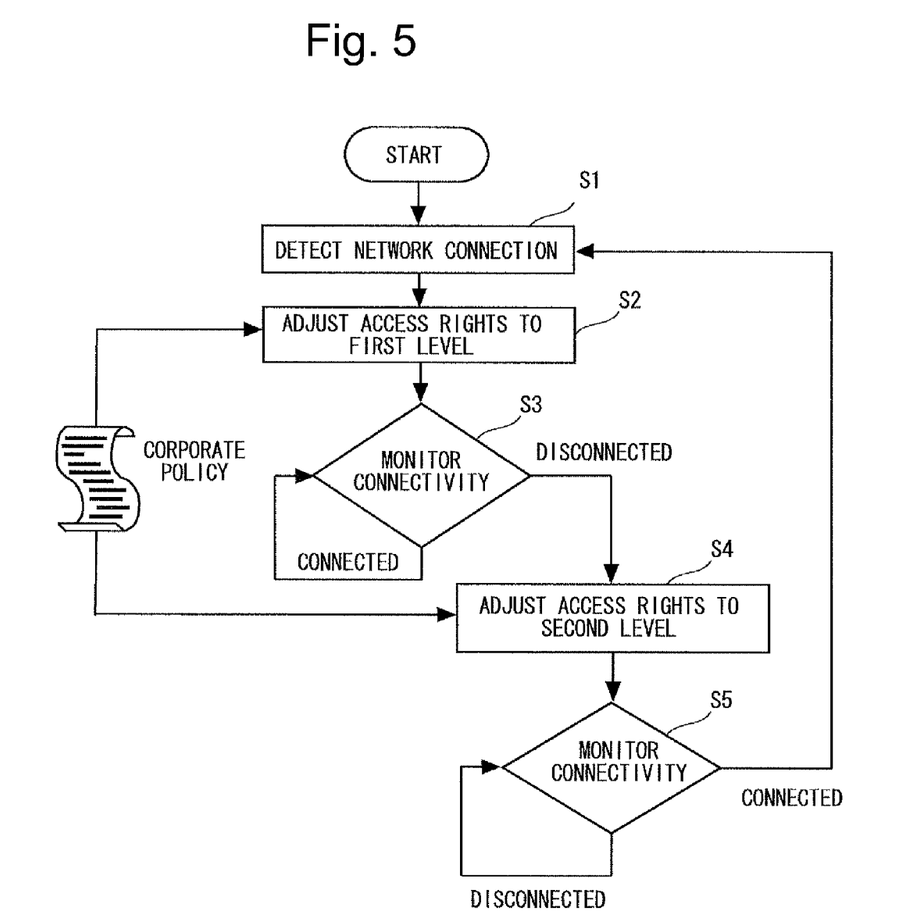
FIG. 5 is a simplified flow diagram illustrating an access rights management procedure for use in the communication system of FIG. 2.

An exemplary rights adjustment procedure which may be implemented by the rights adjustment module 236 of the mobile device 212 is illustrated in the flow chart of FIG. 5.

As seen in FIG. 5 when the rights adjustment module 236 detects a network connection with the server 214 of the corporate network (S1), it grants data access rights for corporate data 231 mounted and decrypted locally at the mobile device 212 at a first level in dependence on the corporate policy (S2). Similarly, when the rights provisioning module 462 detects a network connection with the mobile device 212 of the corporate network it grants data access rights for corporate data 231 virtually mounted and decrypted remotely at the server 214 at the first level in dependence on the corporate policy.

The rights adjustment module 236 continues to monitor the connection until the mobile device disconnects from the corporate network (S3). At this point the rights adjustment module 236 modifies the access rights for the locally stored corporate data 231 to a second level which, in this embodiment, is more restrictive than the first but nevertheless allows limited access (S4). For example, the first level of access rights may allow both reading of and writing to the data whilst the second level may allow reading of the access rights only. The rights adjustment module 236 and right provisioning module 462 then return to monitoring the connectivity until connection is detected once again (S5), at which point the access rights for the corporate data 231 are adjusted back to the first level once again in accordance with the corporate policy.

Accordingly, the communication system described above enables the management of data rights for locally stored corporate data 231 when the device becomes disconnected from a corporate network. This approach to rights management provides greater flexibility by allowing adjustment of the access rights/permissions for the data in dependence on connectivity. Thus a user is still provided with the ability to access the data when disconnected, based on a corporate security policy, albeit potentially in a more restricted manner than when they are connected to the corporate network.

Modifications and Alternatives

A detailed embodiment has been described above. As those skilled in the art will appreciate, a number of modifications and alternatives can be made to the above embodiment whilst still benefiting from the inventions embodied therein. By way of illustration only a number of these alternatives and modifications will now be described.

In the embodiments described above, the mobile device 212 and server 214 each include transceiver circuitry. Typically this circuitry will be formed by dedicated hardware circuits. However, in some embodiments, part of the transceiver circuitry may be implemented as software run by the corresponding controller.

In the above embodiment, a number of software modules were described. As those skilled will appreciate, the software modules may be provided in compiled or un-compiled form and may be supplied to the server or to the mobile device as a signal over a computer network, or on a recording medium. Further, the functionality performed by part or all of this software may be performed using one or more dedicated hardware circuits. However, the use of software modules is preferred as it facilitates the updating of server and the mobile device in order to update their functionalities. Further, the modules described above may not be defined as separate modules and may instead be built in to the operating system of the server and/or the mobile telephone.

In the above description, the server 214 and the mobile device 212 are described, for ease of understanding, as having a number of discrete modules (such as the connection/communications control and rights assignment modules 391, 236). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. Where separate modules are provided, the functionality of one or more of the above modules may be performed by a single module.

Whilst the embodiments have been described primarily with reference to a single mobile device 212 and a single server 214 it will be understood that a plurality of mobile devices may be connected or disconnected from the corporate network and have their rights adjusted accordingly. Similarly a mobile device 212 may be connectable to any number of servers 214 in a corporate network (or in different networks having different data owners).

It will be further appreciated that communication between the mobile device 212 and the computer network 214, may use any suitable wireless or wired communication protocol and associated technology. For example the mobile device may be configured for communication using a Bluetooth and/or WiFi protocol in the case of radio communication, an IrDA (Infrared Data Association) protocol in the case of infrared communication and/or a Universal Serial Bus (USB) protocol in the case of wired communication. The mobile device 212 and server 214 may also be configured for long range communication via a mobile telephone network (e.g. via base station, radio network controller, core network etc) to allow long range connection to the server 214.

It will be appreciated that although the mobile device 212 is described as a mobile or cellular telephone (e.g. a Smartphone) it may be any suitable device for example a personal digital assistant (PDA), palmtop or notebook computer.

It will also be appreciated that the identity of the server(s) for which connectivity based access rights management is to be applied, may alternatively or additionally be provided to the rights adjustment module 236 by a local application 226, which provides access to a remote user session, upon successful connection setup with the cloud server 214. Moreover, data identifying the server(s), connectivity with which rights management is to be based upon, may be stored on the external storage device 230 (e.g. in the secured area 232 of a USB device or the like) and/or in the secured area 227 of the local file system 225.

The rights adjustment module 236 may act as a local agent that is effectively given an administrative role to grant full or limited access to the corporate data in accordance with the corporate policy. It will be appreciated, however, that a separate program may alternatively or additionally be given the role of adjusting the rights, under the control of the rights adjustment module.

The provisioning of configuration parameters for defining how and under what conditions the rights adjustment module 236 adjusts the access rights can be performed using any suitable mechanism, for example, Over-the-Air techniques, SMS Push methods, and/or OMA Device Management mechanisms. Initial provisioning, however, may alternatively or additionally be provided during initial installation and/or setup of the rights adjustment module 236 by storing initial and/or default configuration parameters in the secured memory area 227 of the local file system 225 (or portable storage device 230).

The access rights may be defined on a file by file or document by document basis, for example based on a security level assigned to the document and/or based on the identity of a particular user or the user's membership of a particular group. Moreover, the data (corporate or personal) stored locally and/or remotely may be encrypted in such a way that users who are not explicitly granted access rights cannot access to the data.

The different assignable access rights may extend beyond simple reading and writing of the stored data and may include: rights to copy documents and/or move them to a different location; rights to print the data or attach a file to an email; rights to access the data using certain local applications (e.g. word processors, spreadsheets, document viewers); rights to manipulate the data in a particular way using a corresponding functions of the local applications; or the like. Access rights may, therefore, include, read permissions, write permissions, print permissions, copy permissions, share permissions, send permissions, permissions to edit with (or without) tracking changes, permissions to execute, or the like.

Whilst it is particularly advantageous for a user to be granted more limited (restrictive) access rights when disconnected from the corporate network than when connected, the rights adjustment module could be configured to grant less restricted access rights when the mobile devices disconnects (e.g. to allow a user to make local editable copies when disconnected but not when connected). Moreover, when disconnected, some access rights could be made more restrictive (e.g. to prevent writing to a 'master' copy) whilst other access rights could be made less restrictive (e.g. to allow editable copies to be made). More restrictive rights may also be used in a connected state to reduce the risk of infection of the corporate network by a virus infecting the user's mobile device (e.g. to prevent execution of executable files stored locally to the mobile device).

Whilst two different levels of access rights were described there may be any number of levels (or combinations) of access rights which may be assigned based on different factors and the connectivity with the corporate network. Different combinations of access rights may also be granted based on which of a plurality of different servers a user's device is connected to. Moreover, different access rights may be granted based simply on whether or not the mobile device is connected to the internet regardless of whether the mobile device is connected to a particular cloud server via the internet—this is particularly useful for preventing confidential files from being deliberately or unintentionally shared or otherwise publically disclosed over the internet.

It will be appreciated that since the rights adjustment module 236 and/or the rights provisioning module 462 know which access rights should be applied when the mobile device is connected to the server and which access rights should be applied when the mobile device is disconnected, they may be configured to apply only the differences between the different sets of access rights when adjusting (or re-adjusting) the access rights. Advantageously, this can provide faster access to the data because only the differences between first and second level is applied.

Various other modifications will be apparent to those skilled in the art and will not be described in further detail here.

A program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semi-conductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

<Incorporation by Reference>

This application is based upon and claims the benefit of priority from United Kingdom patent application No. 1007151.2, filed on Apr. 29, 2010, the disclosure of which is incorporated herein in its entirety by reference.

Industrial Applicability

The present invention relates to a system, methods, and associated devices for managing data access rights and in particular, but not limited to, the management of access rights for data stored in the memory of a mobile communications device or on a portable storage device suitable for connection to a mobile communications device.

REFERENCE SIGNS LIST 110, 210 COMMUNICATION SYSTEM
112, 212 MOBILE DEVICE
114 CLOUD SERVER
116 COMPUTER NETWORK
118 BASE STATION
120 WIRELESS ROUTER
122 APPLICATIONS
124, 131, 224, 231 CORPORATE DATA
126, 226 APPLICATIONS
128 VIRTUALIZED ACCESS
130 PORTABLE STORAGE DEVICE
132, 227, 232 SECURED MEMORY AREA
214 CLOUD SERVERS
216 IP NW
222 APPLICATIONS
225 LOCAL FILESYSTEM
229, 233 PERSONAL AREA
230 PORTABLE STORAGE DEVICES

236 RIGHT ADJUSTMENT MODULE
371, 453 TRANCEIVER CIRCUIT
372, 451 NETWORK INTERFACE
373 BASE STATION INTERFACE
375, 450 CONTROLLER
377 LOUDSPEAKER
379 MICROPHONE
381 DISPLAY
383 KEYPAD
385, 457 MEMORY
387, 459 OPERATING SYSTEM
389 STORAGE UNIT INTERFACE
391, 460 CONNECTION/COMMUNICATION CONTROL
462 RIGHETS PROVISIONING
464 ENCRYPTED VOLUME

The invention claimed is:

1. A method of managing access rights for data held locally in an internal memory of a mobile communications device and in a portable storage device connected to the mobile communications device, the mobile communications device connected to a network, the data having a first set of access rights, the method comprising:
   detecting disconnection of the mobile communications device from the network; and
   the mobile communications device adjusting the access rights from the first set of access rights to a second set of access rights for the data stored in a secure memory area of the internal memory and the portable storage upon detection of the disconnection;
   wherein the first set of access rights is different from said second set of access rights;
   wherein said adjusting said access rights to said second set of access rights comprises granting access rights which vary in dependence on: an identity of a file comprising the data; a file type of the file comprising the data; a rights access level assigned to the file comprising the data; membership of the file comprising the data in a predefined group; and an identity of a directory in which the file comprising the data is located; and
   wherein detecting disconnection of the mobile communications device from the network comprises detecting disconnection of said mobile device from predefined server apparatus.

2. A method according to claim 1 wherein the second set of access rights comprises at least one access right which is more restrictive than a corresponding access right of the first set of access rights.

3. A method according to claim 1 wherein the first and second set of access rights each comprises at least one of read permissions, write permissions, and execute permissions.

4. A method according to claim 1 wherein said adjusting said access rights to said second set of access rights comprises granting access rights which vary in dependence on at least one of an identity of a user of the mobile device and membership of the user of the mobile device in a predefined user group.

5. A method according to claim 1 wherein said method further comprises: determining that the mobile communications device is connected to server apparatus; obtaining information representing the identity of the server apparatus to which the mobile device is connected; obtaining information representing the identity of the predefined server apparatus; and comparing the identity of the server apparatus to which the mobile device is connected with the identity of the predefined server apparatus, whereby to determine connectivity of said mobile device to said predefined server apparatus.

6. A method according to claim 5 wherein said method is performed by a rights management module operating on said mobile device and wherein said information representing the identity of the predefined server apparatus is obtained from configuration parameters provided for configuring said rights management module.

7. A method according to claim 5 wherein said information representing the identity of the predefined server apparatus is obtained by retrieving it from the data held locally relative to the mobile communications device.

8. A method according to claim 5 wherein said information representing the identity of the predefined server apparatus is obtained by receiving it from an application running locally on the mobile communications device.

9. A method according to claim 1 wherein the data is encrypted and wherein the method comprises decrypting the data for which the access rights are granted on the mobile communications device when the mobile communications device is not connected to the network.

10. A method according to claim 1 wherein the data is encrypted and wherein the method comprises receiving a decrypted version of the data for which the access rights are granted, from server apparatus, when the mobile communications device is connected to the network.

11. A method according to claim 1 wherein the method comprises detecting an attempt to mount a portable storage device on which said data is stored on the mobile communications device, requesting entry of secure input information from a user of the mobile communications device, receiving the secure input information from the user, verifying the received secure input information, allowing successful mounting of the portable storage device if the secure input information is successfully verified, and inhibiting mounting of the portable storage device if the secure input information is not successfully verified.

12. A method according to claim 1 wherein the method further comprises detecting a change in the connectivity of the mobile communications device to a network from disconnected to connected and adjusting the access rights from the second set of access rights to the first set of access rights on detection of the change.

13. A method of provisioning a mobile communications device for managing access rights for data held locally in an internal memory of the mobile communications device and in a portable storage device connected to the mobile communications device, the method comprising:
   providing the mobile communications device with configuration parameters defining a first set of access rights for the data for use when the mobile communications device is connected to a network; and
   providing the mobile communications device with configuration parameters defining a second set of access rights for data stored in a secure memory area of the internal memory and in the portable storage device for use when the mobile communications device is not connected to the network;
   wherein the first set of access rights is different from said second set of access rights; and
   the mobile communications device adjusting access rights from the first set of access rights to the second set of access rights upon detection of a disconnection;
   wherein said providing said configuration parameters comprises providing configuration parameters which define access rights which are dependent on: an identity of a file comprising the data; a file type of the file comprising the data; a rights access level assigned to the file comprising the data; membership of the file comprising the data in a predefined group; and an identity of a directory in which the file comprising the data is located.

14. A method as claimed in claim 13 wherein the method comprises determining that updated configuration parameters are available, and providing said updated configuration parameters to said mobile communications device in response to said determination.

15. A mobile communications device having
an access rights managing unit that manages access rights for data held locally in an internal memory of a mobile communications device and in a portable storage device connected to the mobile communications device, relative to the mobile communications device,
the access rights managing unit comprising:
a first receiving unit that receives, at the mobile communications device, configuration parameters defining a first set of access rights for the data for use when the mobile communications device is connected to a network;
a second receiving unit that receives, at the mobile communications device, configuration parameters defining a second set of access rights for data stored in a secure memory area of the internal memory and in the portable storage device for use when the mobile communications device is not connected to the network; and
a storing unit that stores said configuration parameters for use in managing said access rights for the data held locally relative to the mobile communications device;
wherein the first set of access rights is different from said second set of access rights;
wherein said configuration parameters define access rights which are dependent on: an identity of a file comprising the data; a file type of the file comprising the data; a rights access level assigned to the file comprising the data; membership of the file comprising the data in a predefined group; and an identity of a directory in which the file comprising the data is located.

16. A mobile communication device as claimed in claim 15 wherein said access rights managing unit comprises a rights management module operable to run on said mobile communications device.

17. A mobile communications device as claimed in claim 16 wherein said rights management module is operable to initiate upon boot-up of the mobile device.

18. A non-transitory computer readable medium storing a program for causing a computer to carry out a method of managing access rights for data held locally in an internal memory of a mobile communications device and in a portable storage device connected to the mobile communications device, the mobile communications device connected to a network, the data having a first set of access rights, the method comprising:
detecting disconnection of the mobile communications device from the network; and
the mobile communications device adjusting the access rights from the first set of access rights to a second set of access rights for the data stored in a secure memory area of the internal memory and the portable storage upon detection of the disconnection;
wherein the first set of access rights is different from said second set of access rights;
wherein said adjusting said access rights to said second set of access rights comprises granting access rights which vary in dependence on: an identity of a file comprising the data; a file type of the file comprising the data; a rights access level assigned to the file comprising the data; membership of the file comprising the data in a predefined group; and an identity of a directory in which the file comprising the data is located; and
wherein detecting disconnection of the mobile communications device from the network comprises detecting disconnection of said mobile device from predefined server apparatus.

19. A mobile communications device having a module for managing access rights for data held locally in an internal memory of the mobile communications device and in a portable storage device connected to the mobile communication device, the access rights managing module being operable to: (i) receive configuration parameters defining a first set of access rights for the data for use when the mobile communications device is connected to a network; (ii) receive configuration parameters defining a second set of access rights for data stored in a secure memory area of the internal memory and in the portable storage device for use when the mobile communications device is not connected to the network; and (iii) store said configuration parameters for use in managing said access rights for the data held locally relative to the mobile communications device; wherein the first set of access rights is different from said second set of access rights;
wherein said configuration parameters which define access rights which are dependent on: an identity of a file comprising the data; a file type of the file comprising the data; a rights access level assigned to the file comprising the data; membership of the file comprising the data in a predefined group; and an identity of a directory in which the file comprising the data is located.

20. A server apparatus having a provisioning module for provisioning a mobile communications device to manage access rights for data held locally in an internal memory of the mobile communications device and in a portable storage device connected to the mobile communications device, the provisioning module being operable to provide the mobile communications device with: (i) configuration parameters defining a first set of access rights for the data for use when the mobile communications device is connected to a network, and (ii) configuration parameters defining a second set of access rights for data stored in a secure memory area of the internal memory and in the portable storage device for use when the mobile communications device is not connected to the network; wherein the first set of access rights is different from said second set of access rights;
wherein said configuration parameters which define access rights which are dependent on: an identity of a file comprising the data; a file type of the file comprising the data; a rights access level assigned to the file comprising the data; membership of the file comprising the data in a predefined group; and an identity of a directory in which the file comprising the data is located.

* * * * *